M. SHOELD.
PROCESS OF PRODUCING ALUMINUM NITRID.
APPLICATION FILED JAN. 28, 1918.
1,274,797.
Patented Aug. 6, 1918.
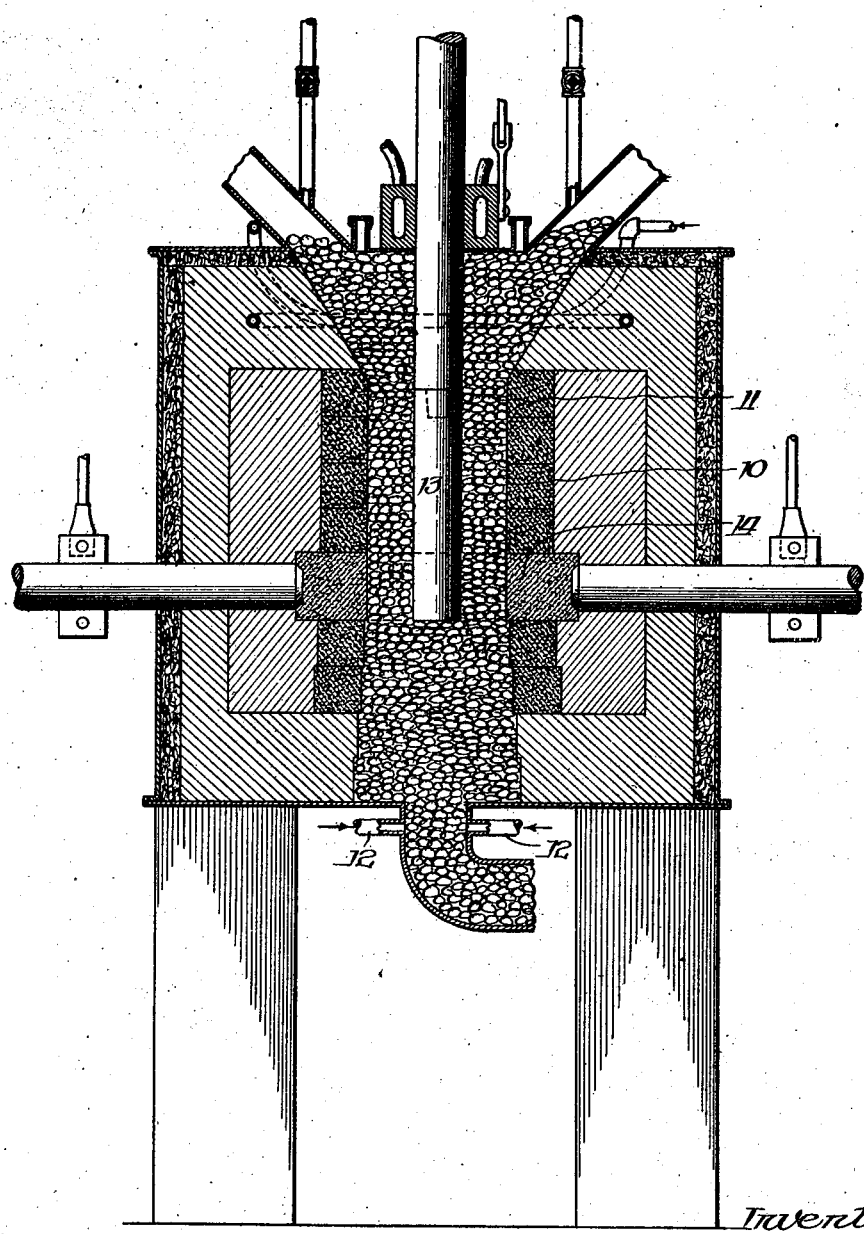

UNITED STATES PATENT OFFICE.

MARK SHOELD, OF CHICAGO, ILLINOIS, ASSIGNOR TO ARMOUR FERTILIZER WORKS, OF CHICAGO, ILLINOIS, A CORPORATION OF NEW JERSEY.

PROCESS OF PRODUCING ALUMINUM NITRID.

1,274,797.  Specification of Letters Patent.  Patented Aug. 6, 1918.

Application filed January 28, 1918. Serial No. 214,056.

*To all whom it may concern:*

Be it known that I, MARK SHOELD, a subject of the King of Sweden, residing at Chicago, in the county of Cook and State of Illinois, have invented certain new and useful Improvements in Processes of Producing Aluminum Nitrid, of which the following is a specification.

The present invention resides in an improved and novel process or method of producing a desired chemical product, such, for example, as aluminum nitrid, by uniformly treating or intermixing a suitable body of solid pieces, or a desirable mixture of solid materials, with a gas and simultaneously uniformly heating such material and gas to effect the desired chemical reaction, such heating being conveniently brought about by sending a current of electricity directly through the material, the heat, as is well understood, being developed by reason of the electric resistance of such body. The prime object of the invention is a simultaneous even distribution of the gas throughout the pieces or particles of solid material to be treated and a substantially uniform heating of the material whereby to render conditions ideal for the effecting of the chemical reaction.

A further purpose of the invention is to cause the two materials, solid and gaseous, to travel in opposite directions to and from a heated zone and in such intimate relation that the heated treated solid material may transfer its heat to the cool incoming gas and the heated spent gas may transmit its heat to the incoming, cool, solid material, thus conserving heat and confining and restricting the heat zone.

In carrying out or performing the preferred method, the solid material to be treated (assuming, for instance, the production of aluminum nitrid), such for example, as briquets composed of a suitable binder holding or cementing together finely-divided or comminuted carbon and alumina, is caused to travel vertically downwardly, the feed thus being brought about by gravity, and at the same time, a current of nitrogen, or nitrogen with a small percentage of a non-oxidizing gas, such as carbon monoxid, is caused to traverse or pass vertically upwardly through such column of briquets. Under these circumstances, there is no tendency for the gas to be distributed unequally throughout the cross-section of the descending material and accordingly the gas is uniformly dispersed in every part of such body of briquets. At the same time, such body is substantially equally heated throughout by reason of an electric current passing directly through the material, the heating being effected by the resistance which such material offers to the passage of the current. In other words, the electric furnace is of the resistor type, as distinguished from the arc form, which naturally lends itself more readily to the uniform heating desired. Thus we have the even electrical heating and the simultaneous uniform mixture of the solid material and gas, whereby the chemical reaction takes place uniformly throughout the body with obvious economy and efficiency.

As the cool entering gas flows to the heated zone, it passes through the hot solid material being discharged and becomes raised in temperature, abstracting the heat from such material; and, on the other hand, the spent or exhausting heated gases, after leaving the heat zone or section, pass through the incoming cool body of solid material and transmit their heat to the latter, thus permitting both the discharging gas and the treated briquets to be delivered relatively cool, each being preliminarily or initially heated by the other before passing to the heat zone where the reaction takes place. Thus the heat zone is naturally limited or circumscribed, being kept within desired bounds or limits and prevented from extending beyond a desired sphere or range, and each ingredient of the chemical composition to be produced is preliminarily heated to facilitate their mutual chemical action.

The style and form of apparatus which may be used in performing the process, is, of course, of little importance so far as the process itself is concerned. By way of illustration, however, I have shown in vertical cross-section in the accompanying drawing forming a part of this specification a convenient and desirable appliance of this kind.

This electric furnace has a central, vertical passage or conduit 10 down which the briquets or pieces of solid material 11 descend in a steady stream or flow due to the action of gravity. The gas under pressure is admitted through pipes 12, 12, into the lower part of such column and passes upwardly through it. Because of such upright or vertical disposition of the conduit or passage, this gas naturally becomes practically evenly distributed throughout the cross-section of the mass and this is one of several features of the invention. The appliance also has a vertical graphite electrode 13 depending into the middle of the furnace chamber so that the descending solid material forms a ring or hollow cylinder around it. Opposite the lower end of such electrode, a companion ring-shaped or annular graphite electrode 14 is employed, whereby all of the pieces of the solid material or briquets in their downward course and all of the gas in its ascent through such material pass between the electrodes at which place they are uniformly and evenly heated throughout by the electric current passing through them from one electrode to the other. Thus we have in a limited zone the simultaneous uniform intermixing of the two ingredients, solid and gaseous, and the uniform electric heating of the mass. Of course, the furnace shown has a suitable lining, it is adequately heat insulated, it is equipped with means for continuously feeding the solid and gaseous material, and so forth, but it is unnecessary to detail these, since the process or method proper is the only thing which requires a full understanding.

The cool gas before it reaches the circumscribed or restricted heat zone in the furnace, travels through the heated solid material which has traversed such zone and abstracts some, if not all, of the heat therefrom, thus being itself initially heated preliminary to entering into the chemical reaction at the hot section. In somewhat similar manner the briquets above the heat zone are first heated by the spent or discharging upwardly-flowing hot gases. Such transfers of heat effect the desired initial heating and the two cool inwardly-traveling ingredients from opposite directions tend advantageously to restrict and confine the heat zone.

In the practical performance of this process the mixture of briquets and gas is heated to a temperature of approximately 1800 degrees to 2000 degrees centigrade or a period of substantially 3 to 4 hours, but the process is not necessarily limited either to this temperature or time element, the production of nitrid starting at about 1500 degrees centigrade or lower, but the use of such low temperature is ordinarily impractical.

To those skilled in this art it will be clear that the desired objects of the invention have been secured or attained in the performance of the process in the manner specified, but it should be borne in mind that no particular or especial apparatus is necessary to take advantage of the benefits and advantages accruing from the employment of such improved and novel method.

I claim:

1. The process of producing aluminum nitrid consisting in causing a uniform distribution of a nitrogen-containing gas through a body of briquets composed of comminuted carbon and alumina and a binder and simultaneously evenly heating such uniform mixture at a sufficient temperature to effect the required chemical reaction, substantially as described.

2. The process of producing aluminum nitrid consisting in causing a uniform distribution of a nitrogen-containing gas through a body of briquets composed of comminuted carbon and alumina and a binder and simultaneously evenly heating such uniform mixture at a sufficient temperature to effect the required chemical reaction by passing a current of electricity therethrough, substantially as described.

3. The process of producing aluminum nitrid consisting in causing a uniform distribution of a nitrogen-containing gas through a body of briquets composed of comminuted carbon, alumina, and a binder, simultaneously evenly heating such uniform mixture at a sufficient temperature to effect the required chemical reaction, preliminarily heating said gas by the heat of the briquets after undergoing the chemical reaction, and preliminarily heating said briquets by the heat of the discharging gas, substantially as described.

4. The process of producing aluminum nitrid, consisting in causing a uniform distribution of a nitrogen-containing gas through a body of briquets composed of comminuted carbon, alumina, and a binder, simultaneously evenly heating such uniform mixture at a sufficient temperature to effect the required chemical reaction by passing a heating current of electricity therethrough, preliminarily heating said gas by the heat of the briquets after undergoing the chemical reaction, and preliminarily heating said briquets by the heat of the discharging gas, substantially as described.

5. The process of producing aluminum nitrid consisting in causing a body of briquets each composed of comminuted carbon, alumina, and a binder, to descend in a vertical path, passing a nitrogen-containing gas vertically upward through said body of briquets, thereby securing a substantially-uniform distribution of the gas through the body of briquets, and simultaneously uniformly heating such evenly mixed body of briquets and gas at a sufficient temperature to effect the production of the aluminum nitrid substantially as described.

6. The process of producing aluminum nitrid consisting in causing a uniform distribution of a nitrogen-containing gas through a body of briquets composed of comminuted carbon, alumina, and a binder, by causing said body of briquets to descend in a vertical path, and passing the nitrogen containing gas vertically upward through said body, simultaneously evenly heating such uniform mixture at a sufficient temperature to effect the required chemical reaction by passing a heating current of electricity therethrough, preliminarily heating said gas by the heat of the briquets after undergoing the chemical reaction, and preliminarily heating said briquets by the heat of the discharged gas, substantially as described.

7. The process of producing aluminum nitrid consisting in uniformly mixing a body of briquets composed of comminuted carbon, alumina, and a binder, and a nitrogen-containing gas traveling in opposite directions, and simultaneously uniformly heating an intermediate zone only of such mixture to a temperature of approximately 1800 degrees to 2000 degress centigrade by passing a heating current of electricity therethrough, thereby preliminarily heating the gas by the heat of the briquets after undergoing the chemical reaction and also preliminarily heating the briquets approaching said intermediate zone by the heat of the gas which has traversed such zone, substantially as described.

MARK SHOELD.